(12) United States Patent
Anderson

(10) Patent No.: US 12,276,237 B2
(45) Date of Patent: Apr. 15, 2025

(54) PRESSURE DRAG JET ENGINE

(71) Applicant: Isaac Erik Anderson, Evergreen, CO (US)

(72) Inventor: Isaac Erik Anderson, Evergreen, CO (US)

( * ) Notice: Subject to any disclaimer, the term of this patent is extended or adjusted under 35 U.S.C. 154(b) by 0 days.

(21) Appl. No.: 17/838,167

(22) Filed: Jun. 11, 2022

(65) Prior Publication Data

US 2023/0399996 A1 Dec. 14, 2023

(51) Int. Cl.
| | |
|---|---|
| *F02K 1/38* | (2006.01) |
| *F02C 3/14* | (2006.01) |
| *F02C 3/32* | (2006.01) |
| *F02C 7/04* | (2006.01) |
| *F02K 1/36* | (2006.01) |

(52) U.S. Cl.
CPC .............. *F02K 1/38* (2013.01); *F02C 3/14* (2013.01); *F02C 7/04* (2013.01); *F02C 3/32* (2013.01); *F02K 1/36* (2013.01); *F05D 2220/323* (2013.01)

(58) Field of Classification Search
CPC ........ F02K 1/28; F02K 1/36; F02K 1/38–386; F02K 1/46–50; F02K 7/14–16; F02K 1/32; F02K 1/00–827; F02K 3/00–12; F02C 1/00–105; F02C 3/32; F02C 3/045; F02C 3/165; F02C 6/006; F02C 3/02; F02C 3/14; F02C 3/073; F02C 3/05; F05D 2260/601; F05D 2220/76–77; F01D 15/10; H02K 7/1823; B64D 2027/026; B64D 27/24; B64D 27/10–14
See application file for complete search history.

(56) References Cited

U.S. PATENT DOCUMENTS

| | | | | |
|---|---|---|---|---|
| 4,051,671 | A | * 10/1977 | Brewer | ..................... F02K 1/36 60/749 |
| 7,442,006 | B2 | * 10/2008 | Nguyen | ................ F04D 29/624 29/889.22 |

FOREIGN PATENT DOCUMENTS

| | | | | |
|---|---|---|---|---|
| CN | 101975121 | A | * 2/2011 | ................ F02C 3/14 |
| FR | 1161189 | A | * 8/1958 | |

* cited by examiner

*Primary Examiner* — Stephanie Sebasco Cheng

(57) ABSTRACT

The engine described herein utilizes an internal low pressure near the nozzle to draw fluid through a center section/duct of the engine and therefore through an upstream, cold, turbine. The fluid moving through this center duct-section experiences a pressure differential between the zone of the incoming fluid (which raises pressure upstream) and the low pressure zone generated near the nozzle. With fast-moving fluid around each side of this cold turbine duct, inducing a Venturi effect on the fluid passing through the duct, a low pressure is generated and therefore enacts work on the turbine. Using this method, turbine blades are not down stream of the hot combustion section and therefore can be made with light weight and low melting temperature material. With a cold section turbine, the engine can therefore be considerably lighter and cheaper to manufacture and maintain.

10 Claims, 4 Drawing Sheets

SECTION II - II

SECTION I - I

SECTION II - II

SECTION II - II

PRESSURE DRAG JET ENGINE

CROSS-REFERENCE TO RELATED APPLICATIONS

Figure 1:
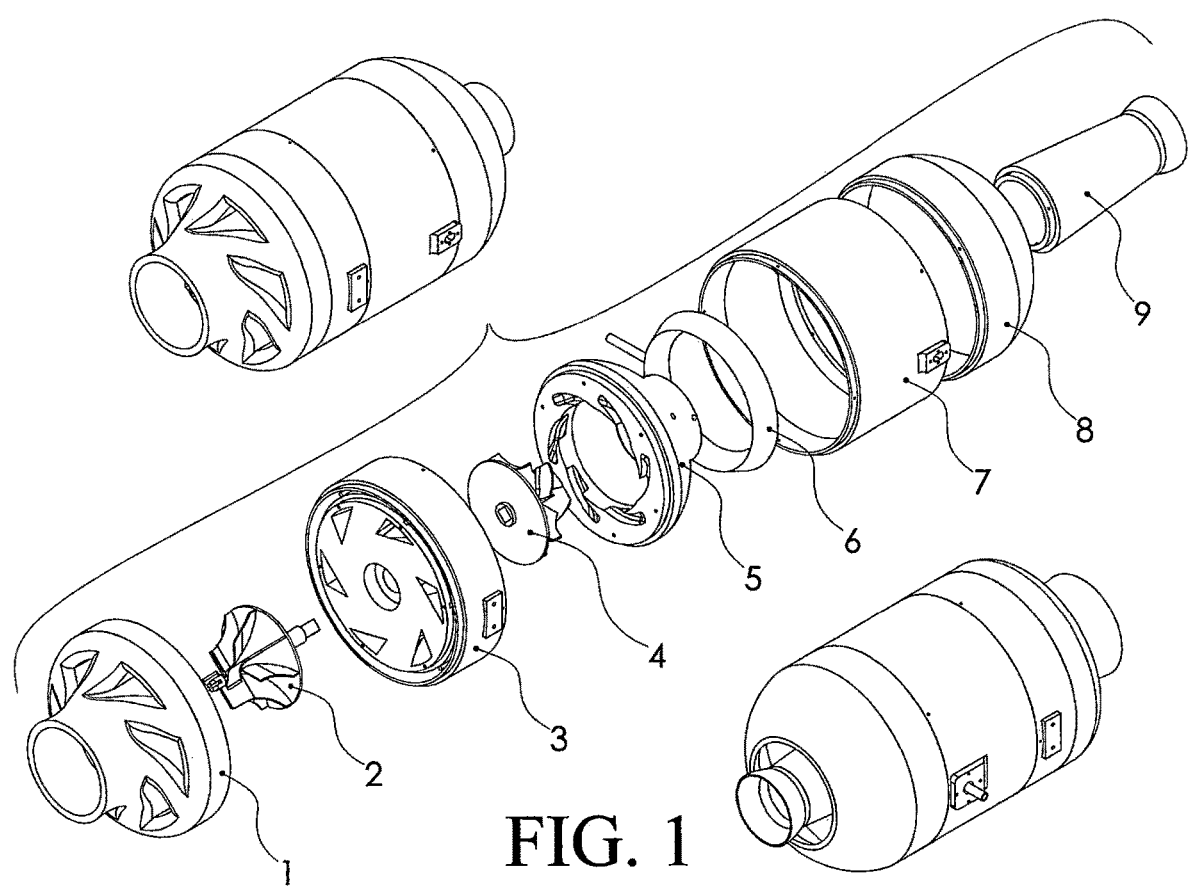

Some of the engines that are similar in some ways to this design are the Cooled Gas Turbine Engine Cooling Air With Cold Air Dump (U.S. Pat. No. 10,458,332 B2) and the Gas Turbine Engine Having Core Auxiliary Duct Passage (U.S. Pat. No. 8,371,806 B2) in which inlet gas and cold-section turbines may be used to empower, improve efficiency, or effectiveness of the compression section. These designs however do not utilize a pressure-drag nozzle to induce a pressure differential to power their cold turbine sections, and therefore would rely on an alternative source to power their compressors; such external powers as incoming air flow, electrical, or a hot-section turbine. The use of a cold turbine section itself is not what makes this invention unique. What is unique with this engine is the use of a pressure-drag/Venturi type nozzle to generate an external pressure differential on the cold section turbine. As such, this invention may improve its efficiency when an incoming flow or higher upstream pressure differential is induced on the inlet, reducing the pressure-drag nozzle's requirement to meet the power needed for the compressor, but is not intended as the main source of shaft power to the compressor.

BACKGROUND OF THE INVENTION

The present invention pertains to gas turbine combustion and air-breathing propulsion of both large and small engines by which it incorporates few moving parts and removes hot section rotary components. The present invention also may embody the use of composite material manufacturing and or rapid additive manufacturing to produce full or partial engines and components.

Turbine engines have shaped the industry by providing tremendous thrust to specific fuel consumption ratio. Utilizing energy from hot combustion exhaust, enables the use of many applications and even replacing prior technologies in some instances. The development of turbine engines has been on going for a quite a while; with some of the earlier versions being used in hydrological applications. The use of turbine engines, specifically turbojet, to produce thrust has been refined more recently, focusing on producing a both high speed fluid jets and upstream pressure differential, towards the objective of aircraft-borne propulsion. Utilizing an inlet and compressor to raise the pressure of the working fluid, and with the addition of a thermal flux, the downstream turbine consumes a portion of the energy to power the upstream working fluid compression. The remaining energy is converted into kinetic energy by means of the nozzle. Since the turbine is downstream of the thermal flux/combustor, the turbine section often receives the highest temperature of the engine, and therefore must be manufactured using high-temp material. Due to the rotating nature of the turbine, the heat transfer to the turbine is larger than to the stationary components, leading to the development of complex and expensive cooling systems to both prolong the life of the engine but also reduce the thermal material requirements.

As the industry continues to improve, better material science and the creation of rapid additive manufacturing has aided in improving the internal components within the turbine engine. Such improvements as boundary layer inducing cooling turbine stator blades, and the creation of single grain compressor and turbine blades. This furthers aids in the longevity and efficiency of the components and engine systems in general. However, often with the requirement of such precision is that the price per component may rise and, consequently, the overall price of the engine. Having the ability to produce cheap components or components rapidly would aid in the reduction of production time, reduce the price of each component and engine, the down-time of an aerial fleet, and the availability to source components in remote or less accessible areas. By producing a product that is able to be produced with minimal access to equipment or made with materials that are inherently inert and inexpensive, aids in the ability and ease of access to turbine applications. The simplified design of this invention is intended to aid specifically towards this goal. The invention's design in Claim 1 may be produced using a varying range of materials, whether from a homogeneous or composite nature. The use of Additive Manufacturing, or 3D-Printing, may also be a benefit added as the shapes of this invention has higher efficiencies when manufactured with smooth varying contours, often created by this manufacturing technique. The invention design is intended to obtain similar efficacy when made from metals, composites, or plastics.

As the intention of the turbine to convert the working fluid's energy into work, the physical requirements due to the operational condition in a traditional turbine engine are very demanding. Therefore the ability to avoid rotating engine components downstream of the combustor is imperative. If the turbine is able to receive energy communication/flux from the fast, hot, and energy rich combustor exhaust, without rotating through the hot gasses itself, then it can be composed of inexpensive, lightweight material with a wider ranges of material choices while still providing work on the compressor section. The turbine communicates work through the shaft to the compressor, due to the energy differential between the upstream and downstream stations. Thereby, inducing a sufficient energy differential on a turbine that is not operating downstream of the hot-section will still induce the work required to power the compression section, and reduce the physical requirements of the turbine.

As components of the eventual engine specific thrust calculations, they implicate the efficiency dealing with dump diffusion and mass-flow. These detractors are the nozzle and inlet pressure-drag losses. These loses negatively impact the overall engine performance and thrust. It is the intention of this invention to not directly improve these factors but to use these inherent pressure differentials as the method for cold-section fluid compression, generating propulsion.

BRIEF SUMMARY OF THE INVENTION

A brief summary of the invention and its benefits:
1. Efficiency—Using a lighter turbine section means less internal bearing friction and less shaft spool-up time, reducing the overall time required to provide thrust and the energy required to bring the engine up to speed.
2. Cost reduction—Using a cold-section turbine means components can be manufactured using cheap materials and a less strenuous process, and may be fabricated in-house.
3. No Hot-Section Rotary Components—Utilizing a cold-section Venturi induced turbine means there are no rotating components in hot gasses, thereby reducing the potential for thermally induced failures, and the higher complexity required to keep components cool.
4. Low-Melting Point Material Composition—More temperature sensitive materials can be used to manufacture most of the invention, as only the hot combustor section interacts with high temperature gasses 5. Light-Weight—The only components that interact with high temperature gasses are non-rotating cylindrical type components, and no hot-section turbine is needed, the overall weight of the engine can be vastly reduced.
6. Manufacturing and Maintenance Complexities—There are few components required for the invention to function and each component may be combined into fewer components, the number of required parts for fabrication and maintenance are vastly reduced. This coupled with the use of non-exotic materials; the invention may be manufactured through less labor intensive methods, such as additive manufacturing.

It is the intent of most turbine engines to induce work on their environments, and it is therefore also the intent of this invention. The Pressure-Drag Jet Engine, as in Claim 1, has many advantages over similar type turbine engines; principally, it can be produced for a fraction of the price, use less exotic materials, and be built in much less time since no hot-section turbine is required. As desired this invention may be produced in near entirety using rapid additive manufacturing technologies and techniques, and may be produced with low-melting point materials such as some plastics and other composites. The advantage of being able to additive manufacture functional turbine components and a complete engine, means it can be built or serviced in remote locations. The inspiration behind this invention also aligns with the use on unoccupied remote vehicles as it can be a low cost thrust solution; but is not limited specifically to such use as the size and output thrust can be scaled or altered to fit a specific need.

The unique functionality of this invention can be attributed in part to the use of the pressure-drag nozzle in claim 7, wherein the fluid dynamic relationship and communication between the hot-section gasses and the cold-section turbine gasses occurs and a pressure differential is formed; thus drawing upstream flow through the dual-inlet gas intake, cold-section turbine stator vanes, cold-section turbine blades, and cold-section turbine duct in claim 6. The scientific principal used by the pressure-drag nozzle can be observed and validated through various techniques and methods, as well as in various fluid mediums including but not limited to liquid with high range of Froude numbers, and compressible gasses. The use of Computational Fluid Dynamics can also be used to illustrate this principal and as a point for optimization of flow characteristics. This invention has utilized a number of these method and prototypes to produce this phenomenon.

For stage and manufacturing simplicity this invention can be fabricated in its least stage form, with a single compressor and single turbine, of which the centrifugal type is preferred for its large single-stage pressure rise. This least stage form however, is not a requirement and numerous stages may be added to improve thrust or efficiency.

The fluid dynamics aft/downstream of the pressure-drag nozzle is what generates the upstream pressure differential in the cold turbine section. As such the pressure-drag engine, as in claim 1, is harnessing an external low pressure region aft of the nozzle but communicably downstream of the cold-section turbine.

An easier to service and manufacture engine may be had by of combining the internal engine functions, which are stated in the claims of the invention. By including the compressor inlet, diffuser, flow straighteners, and the turbine inlet into a single component the number of components can be reduced and the incoming low angles may be optimized. Through combining some of the compressor diffusers, axial flow straighteners, turbine inlet nozzles, and compressor-turbine shaft bearing mounts into the same component a further simplification and ease of manufacturing may be obtained. Through the use of combining the turbine flow guides/channels, downstream diffuser, beginning of the turbine duct as described in claim 6, and some of the radial diffusers for the hot combustor section as described in claim 4, the size and planform area of the engine can be reduced as well as the total number of components. Cavities may be embedded within such hot-section components by which fuel may flow through, thus cooling the diffuser and heating the fuel, similar to a regenerative heat exchanger with the benefit of removing heat generated by the compressor.

These features are not only inherently unique, but also contribute to the uniqueness of the invention.

BRIEF DESCRIPTION OF THE SEVERAL VIEWS OF THE INVENTION

Each Figure depicts the functional components that make up the engine.

FIG. 1: An exploded view of the pressure-drag jet engine, with the top left being an assembled isometric view and the bottom right being the reverse side assembled.

Figure 2:
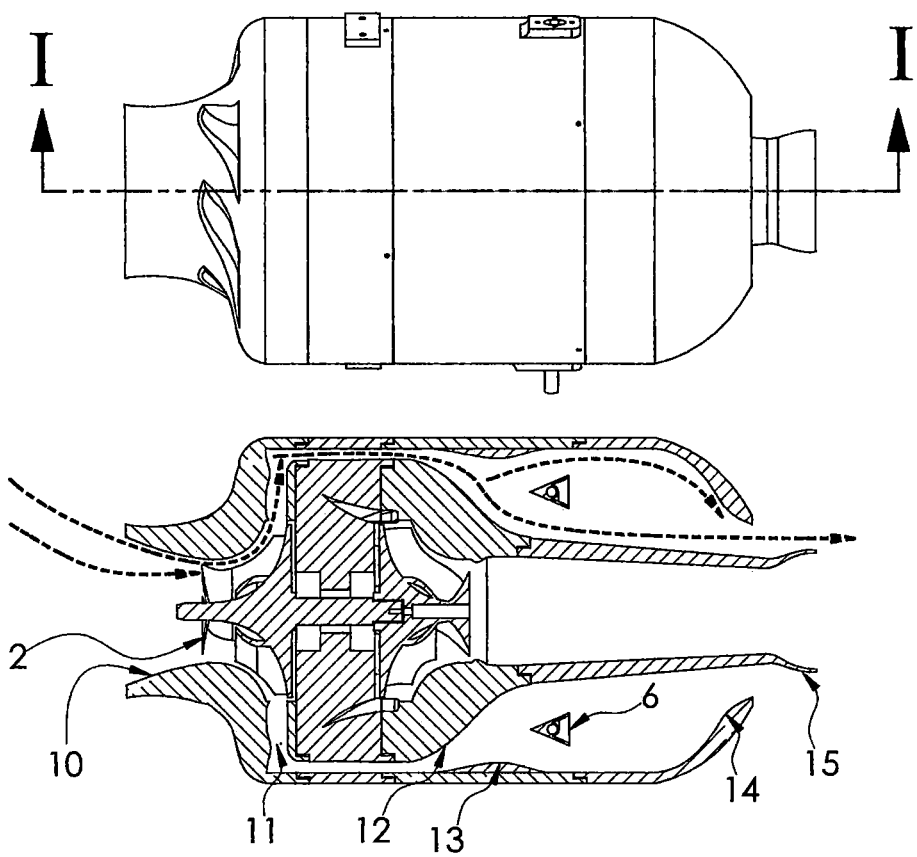

FIG. 2: Cut away view of the pressure-drag jet engine illustrating the flow through the compressor and hot combustion section of the engine.

Figure 3:
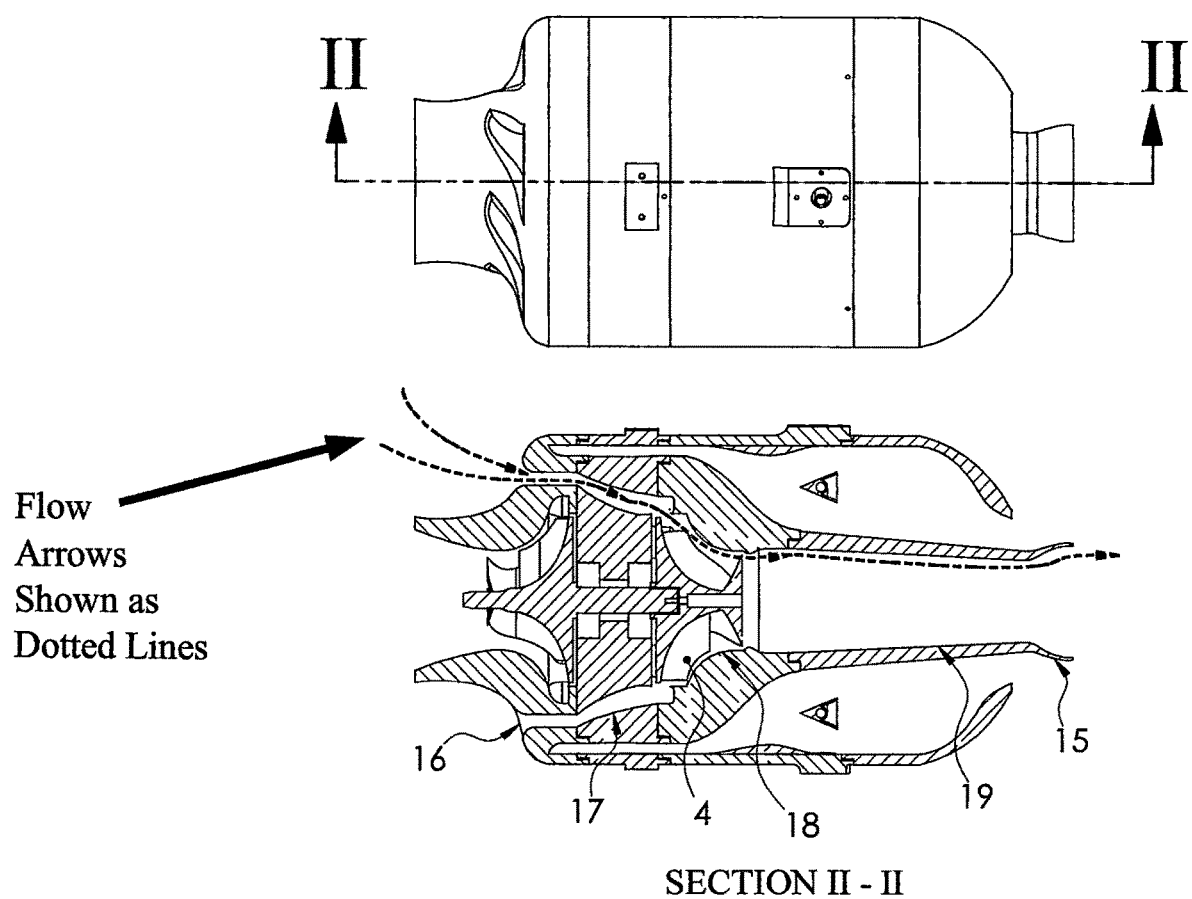

FIG. 3: Cut away view of the pressure-drag jet engine illustrating the flow through the cold turbine sections.

Figure 4:
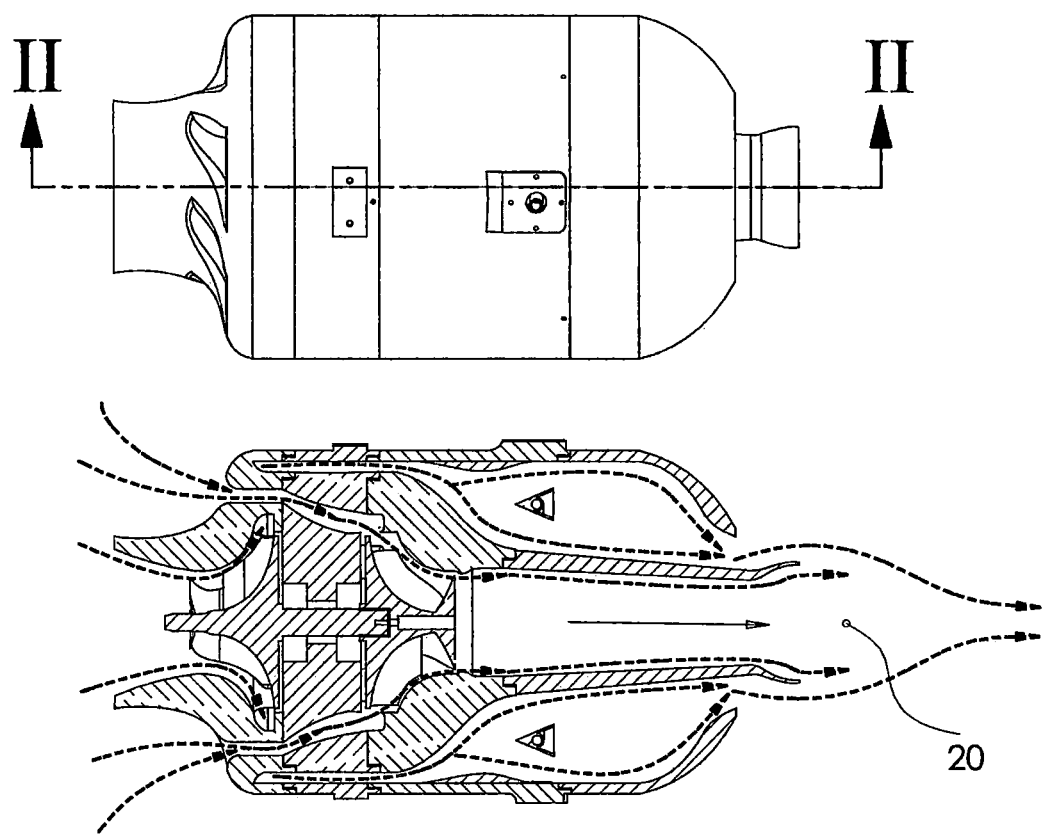

FIG. 4: A Cut away view of the pressure-drag jet engine showing the pressure-drag nozzle's Venturi effect and associated streamlines.

DRAWING LIST REFERENCE NUMERALS

FIG. 1
1) is the dual-inlet gas intake and compressor diffuser that contains the three sub functions: inlet to the compressor section, inlet to the turbine nozzles, and the annular-radial diffuser to the compressor section;
2) is the compressor and shaft used that is connected to the turbine through the turbine nozzle/shaft bearing support component;
3) this component also houses the compressor section outer axial-flow straightener. Turbine flow guide-nozzle and shaft bearing housing;
4) is the internal cold turbine, that is bound by the turbine incoming flow guide-nozzle and the outgoing turbine flow guide;
5) this component functions as the turbine incoming flow guide, initial outgoing flow guide, and the combustion section's inner annular flow diffuser;
6) is the combustor, which raises the combustion section's temperature and pressure by combusting fuel that enters it;
7) is the combustion section's outer annular flow diffuser, outer combustion containment wall, and also retains the combustor in place;
8) is the pressure-drag outer nozzle, which accelerates and (combined with the inner nozzle) directs the hot gasses from the combustion section to a convergence point.
9) is the turbine diffuser duct and pressure-drag inner nozzle, by which the low pressure zone (generated from fast flow passing between the inner and outer nozzles converging), is communicated through to the turbine and further upstream.

FIG. 2

10) is the portion of the dual-inlet gas intake that confines flow into the compressor;
2) is the compressor and shaft;
11) is the radial compressor diffuser, when in combination with the compressor, compresses/diffuses the flow that enters it;
12) is the inner annular-radial combustion section diffuser, responsible for diffusing the flow from the compressor, and straightening the flow while reducing fluid boundary layer growth/separation before entering the combustion region;
13) is the outer annular-radial combustion section diffuser, responsible for adjusting the flow inward to reduce separation from the inner diffuser;
6) is the combustor responsible for raising the temperature of the incoming gas, using a fuel source;
14) is the pressure-drag outer nozzle's inner surface, responsible for maintaining flow angle changes at a rate suitable to produce desired flow characteristics and reduce nozzle losses;
15) is the pressure-drag inner nozzle's outer surface, in conjunction with the outer nozzle, is responsible for generation of the low pressure zone and flow convergence on the inside of the nozzle;

FIG. 3

16) is the portion of the dual-inlet gas intake that confines flow into the turbine nozzle;
17) is the incoming turbine flow guide nozzle, responsible for increasing the flow even more before reaching the turbine guides/stators;
4) is the internal cold turbine, which receives flow from the turbine flow guides/stators, and rotates imparting work on the compressor shaft;
18) is the turbine outflow guide and duct, which aids in straightening the rotating flow from the turbine as well as diffusing the outgoing flow. This helps in insuring that the fastest flow through the cold turbine sections occurs within the turbine blades;
19) is the cold turbine section duct, which straightens the flow further and prepares the flow for interaction with the pressure-drag nozzle;
15) is the inner pressure-drag nozzle's outside edge, which both diffuses the flow from the cold turbine section duct 19 and aids in producing desired boundary conditions to generate the flow convergence and pressure differential 20, similar to a Venturi effect;

FIG. 4

20) is the convergence point of the hot gasses after they have exited the outer pressure-drag nozzle, by which a low-pressure zone is formed and the pressure differential is communicated upstream in the cold turbine sections.

DETAILED DESCRIPTION OF THE INVENTION

The invention is composed of six main functions:
1) Partition or divert (via inlet gas separator 1) incoming airflow into either the turbine section or the compressor section and accelerate (via the incoming turbine flow guide nozzle 17) incoming airflow into the turbine section. This inlet gas separator 1 plays a crucial in ensuring incoming airflow (generated from the forward movement of the engine through the air, the air drawn in due to the compressor generated pressure differential, or due to the downstream pressure-drag nozzle) is partitioned according to the propulsive needs of the engine.
2) Compress and diffuse incoming airflow to raise the pressure inside of the hot combustion section. This compressor 2 spins within the confines of the engine and is connected to the turbine 4, such that shaft work from the turbine can be imparted on the gasses in the compressor section. The compression of flow is important in raising the pressure within the hot sections of the engine 12-15. Efficiency is improved when incoming flow is imparted on the inlet gas separator.
3) Combust (at combustor 6) pressurized gasses such that the average temperature and pressure of the gasses within the hot-section are sufficient to produce both the desired thrust, and the conditions necessary to create the low pressure zone 20 in the pressure-drag nozzle.
4) Provide shaft work to the compressor 2 via the means of a cold-section turbine 4. It is the intention of this turbine 4 to spin as flow passes the turbine blades, introduced by the existence of the pressure differential 20 imparted on the cold turbine related sections from the pressure-drag nozzle.
5) Diffuse air from the turbine 4, in such a way that it accomplishes keeping the annular area the smallest in the last portions of the turbine blades 18. The turbine having an upstream nozzle 16-17 and a downstream diffuser of the cold turbine section duct 19, will ensure the the fastest flow will be through the turbine blades. Another advantage of diffusing the air from the turbine, is that it produces flow that has slow velocity when it reaches the pressure-drag nozzle 15. This aids in creating a larger velocity differential and consequently a larger pressure differential 20. This diffusing action in the cold turbine section duct 19 also acts as a flow straightener to ensure less turbulent flow enters the pressure-drag nozzle and as a physical boundary to contain the higher pressures and temperatures located in the hot combustion section.
6) Through the use of proper nozzle geometry 14&15, the flow exiting the hot-section is directed such that it converges inward at a determined distance aft of the nozzle's mechanical geometry, forming the pressure differential 20. This convergence is dictated by the pressure and flow conditions desired. A way to understand this flow convergence is to consider it as a hot ring of fast-moving gas moves aft-ward and inward. This action of encapsulating the inner-duct's (cold turbine section duct 19) flow generates a low pressure and thus a Venturi like affect. This affect is then communicated upstream through the cold turbine sections, and the pressure differential 20 is formed.

Assembly:

The single compressor and turbine edition of this invention, but not limited to, illustrated in FIG. 1 is an assembly of nine main components, found to be the easiest to manufacture and service. Consisting of an inlet gas separator 1, Compressor blade with shaft and with external gearing/engine starting option 2, Compressor flow straightener-shaft bearing guide-turbine flow nozzle 3, Cold Turbine Section with mating apparatus to the compresssor shaft 4, Turbine flow guide/housing-combustion section inner annular flow diffuser-turbine diffuser duct 5, Combustor 6, Combustion section-Compressor section outer annular flow diffuser 7, Pressure-Drag outer nozzle 8, and Turbine diffuser duct-Pressure Drag Inner Nozzle 9.

A multi-stage axial-flow configuration of this engine has the same functions as the single-stage version.

Functionality:

This engine works through the use of a Pressure-Drag Nozzle that uses high pressure and temperature gasses to create a low pressure zone aft of the engine that communicates a pressure differential through the cold turbine sections. As the hot gasses exit the nozzles, the geometry of these components creates a convergence of gasses at a known and decided distance aft and external of the nozzle, thereby producing a Venturi effect on the cold turbine sections. Thrust can be described as the net sum of the forces, and efficiency as the sum after losses are detracted. This engine utilizes a portion of the nozzle losses to power the cold turbine. The use of this loss is not a direct swap, as utilizing this method is likely to increase some loses. Beneficial results can be made when this engine is compared to the losses, weight, and component prices of a traditional hot-turbine section.

Some Applications of This Invention:

The application of this invention are numerous. The best applications for this engine are when the desired power output is in the form of thrust, not torque. Those applications would include use on aircraft of varying sizes. One benefit of not requiring a hot-section turbine is the reduction in exotic materials or manufacturing techniques. Since there is no hot-section rotating machinery, the component heat-flux observed is the same as the static environment, and does not vary as the rotational velocity changes. Lower-melting point materials may be used, as there are no blades or spinning components in hot gasses. This greatly enables the fabrication and maintenance locations, as the engine can be produced relatively remotely.

What is claimed is:

1. A pressure-drag jet engine comprising:
    an inlet gas separator, wherein a first portion of an incoming airflow passes through a first aperture of said inlet gas separator separately from a second portion of the incoming airflow, which passes through a second aperture of the inlet gas separator;
    a cold compressor section receiving the first portion of the incoming airflow from the first aperture of the inlet gas separator;
    a hot combustion section receiving the first portion of the incoming airflow from the cold compressor section and using the first portion of the incoming airflow to generate hot gasses;
    a turbine flow guide nozzle receiving the second portion of the incoming airflow from the inlet gas separator;
    a cold turbine section receiving the second portion of the incoming airflow from the turbine flow guide nozzle;
    a cold turbine section duct receiving the second portion of the incoming airflow from the cold turbine section; and
    a pressure-drag nozzle comprising an inner nozzle and an outer nozzle, the outer nozzle receiving the hot gasses from the hot combustion section to generate a ring of fast-moving fluid and the inner nozzle receiving the second portion of the incoming airflow from the cold turbine section duct to generate a column of fluid at the center of the ring of fast-moving fluid;
    wherein the ring of fast-moving fluid converges at a location aft and downstream of the pressure-drag nozzle to encapsulate the column of fluid at the center of the ring and impose an externally located low-pressure zone that employs a Venturi effect to draw upon the column of fluid to impart work on the cold turbine section;
    wherein said pressure-drag jet engine has no rotating components in the hot gasses from said hot combustion section;
    wherein the inner nozzle of said pressure-drag nozzle flares outward at an increasing rate and then a decreasing rate from the cold turbine section duct to an aft tip of the inner nozzle.

2. The pressure-drag jet engine according to claim 1, wherein said inlet gas separator extends upstream of the cold compressor section and the cold turbine section;
    wherein said inlet gas separator maintains complete separation between said first portion of the incoming airflow and said second portion of the incoming airflow throughout the entirety of said inlet gas separator; and
    wherein said second aperture of said inlet gas separator comprises triangular geometry to enable the second portion of the incoming airflow to enter into said turbine flow guide nozzle.

3. The pressure-drag jet engine according to claim 1, wherein said inlet gas separator further comprises an annular-radial compressor diffuser, the second aperture of the inlet gas separator formed in the annular-radial compressor diffuser of said inlet gas separator such that the second portion of the incoming airflow passes across the annular-radial compressor diffuser into said turbine flow guide nozzle before said second portion enters the cold turbine section.

4. The pressure-drag jet engine according to claim 1, wherein said hot combustion section comprises a combustion section diffuser and a combustor; wherein the combustion section diffuser comprises an inner annular-radial combustion section and an outer annular-radial combustion section, the inner annular-radial combustion section forming a truncated-cone shaped housing circumscribing the cold turbine section;
    wherein said cold turbine section is a centrifugal turbine having a conical geometry and said inner annular-radial combustion section flares inward around the centrifugal turbine;
    wherein said outer annular-radial combustion section comprises a raised area or bump to reduce a boundary layer of the first portion of the incoming airflow and diffuse the first portion of the incoming airflow.

5. The pressure-drag jet engine according to claim 1, wherein the cold turbine section is coaxial with the cold compressor section.

6. The pressure-drag jet engine according to claim 1, wherein said cold turbine section duct is coaxial with said cold turbine section; and
    wherein said cold turbine section duct extends from said cold turbine section to said pressure-drag nozzle, and said cold turbine section duct confines said second portion of the incoming airflow from said first portion of the incoming airflow and said hot gasses within said hot combustion section.

7. The pressure-drag jet engine according to claim 1, wherein said pressure-drag nozzle accelerates said hot gasses from said hot combustion section and slows said second portion of said incoming airflow from the cold turbine section.

8. The pressure-drag jet engine according to claim 1, wherein the inner nozzle extends aft and downstream of the outer nozzle.

9. The pressure-drag jet engine according to claim 1, wherein the cold turbine section imparts work on the cold compressor section.

10. The pressure-drag jet engine according to claim 1, wherein the turbine flow guide nozzle rotates the second portion of the incoming airflow.

\* \* \* \* \*